(12) United States Patent
Lin et al.

(10) Patent No.: US 8,851,763 B2
(45) Date of Patent: Oct. 7, 2014

(54) OPTICAL FIBER ADAPTER WITH SHUTTER MEMBER

(75) Inventors: Sung An Lin, Miaoli County (TW); Sung Chi Lin, Miaoli County (TW)

(73) Assignee: Ezontek Technologies Co., Ltd., Xinzhuang, Taipei County (TW)

(*) Notice: Subject to any disclaimer, the term of this patent is extended or adjusted under 35 U.S.C. 154(b) by 273 days.

(21) Appl. No.: 13/422,040

(22) Filed: Mar. 16, 2012

(65) Prior Publication Data
US 2013/0064517 A1 Mar. 14, 2013

(30) Foreign Application Priority Data
Sep. 9, 2011 (TW) .............................. 100132778 A

(51) Int. Cl.
G02B 6/38 (2006.01)
(52) U.S. Cl.
CPC ............ *G02B 6/3825* (2013.01); *G02B 6/3849* (2013.01)
USPC .............................................. 385/58; 385/75
(58) Field of Classification Search
USPC .............. 385/53, 55, 58, 73, 75, 76, 136, 139
See application file for complete search history.

(56) References Cited

U.S. PATENT DOCUMENTS

| | | | | |
|---|---|---|---|---|
| 6,461,054 B1 * | 10/2002 | Iwase | ............................... | 385/73 |
| 6,688,780 B2 * | 2/2004 | Duran | ............................... | 385/76 |
| 6,866,424 B2 * | 3/2005 | Tanaka et al. | ................... | 385/55 |
| 7,413,351 B2 * | 8/2008 | Ozawa et al. | ................... | 385/53 |
| 7,507,032 B2 * | 3/2009 | Katagiyama et al. | ........... | 385/73 |
| 7,837,395 B2 * | 11/2010 | Lin et al. | ......................... | 385/58 |
| 8,628,254 B2 * | 1/2014 | Lin et al. | ......................... | 385/70 |
| 8,632,258 B2 * | 1/2014 | Jibiki et al. | ..................... | 385/75 |
| 2007/0098330 A1 | 5/2007 | Ozawa et al. | | |
| 2008/0267566 A1 | 10/2008 | En Lin | | |

FOREIGN PATENT DOCUMENTS

TW 200841062 A 10/2008

* cited by examiner

*Primary Examiner* — Daniel Petkovsek
(74) *Attorney, Agent, or Firm* — Lowe Hauptman & Ham, LLP

(57) ABSTRACT

An optical fiber adapter includes a main body, an elastic shutter member and a pair of inner housings. The main body has an accommodation room. The shutter member includes a fixed portion, a shutter plate, a connecting portion, an extending portion and a bent portion. The fixed portion is positioned in the accommodation room. The connecting portion connects the fixed portion with the shutter plate. The shutter plate is positioned within the accommodation room. The extending portion extends from the fixed portion and is connected with the bent portion. The bent portion is attached to a protrusion on a wall of the accommodation room. The inner housings are positioned within the accommodation room and each include a hollow cylinder extending from a flange. The flanges of the inner housings are attached to each other and one of the flanges is positioned above the bent portion of the shutter member.

13 Claims, 15 Drawing Sheets

OPTICAL FIBER ADAPTER WITH SHUTTER MEMBER

CROSS REFERENCE TO RELATED APPLICATION

This application claims the priority benefit of Taiwan Patent Application Serial Number 100132778 filed Sep. 9, 2011, the full disclosure of which is incorporated herein by reference.

BACKGROUND OF THE INVENTION

1. Field of the Invention

The present invention relates to an optical fiber adapter, and more particularly, to an optical fiber adapter with a shutter member.

2. Description of the Related Art

Recently, the optical fiber has been widely used as signal transmission media because of its high bandwidth and low loss nature. In order to transmit over a longer distance without the need of repeaters, it is common to use a high power diode laser to launch a laser beam into the optical fiber. However, the high power laser beam used to carry information is usually invisible. In other words, the human eyes will be unable to sense the high power laser beam if it leaves from the open end of a fiber cable. Thus, it is required to obstruct the high power laser beam to avoid hurting the eyes when the laser beam leaves from an optical fiber.

Referring to FIG. 1, a conventional fiber adapter 100 includes a housing 110 having a plurality of side walls 160. The side walls 160 define a receiving recess 120. One of the side walls 160 is provided with a slot 130 for mating with the key 192 of the connector 190 when the connector 190 is inserted into the receiving recess 120. In addition, the outer surfaces of two opposite side walls 160 are provided with recesses 140 that a clip (not shown in the figure) can be disposed thereon to facilitate the adapter 100 to be mounted on a panel.

In general, the adapter 100 further has another set of side walls 160 that defines another receiving recess 120. The two receiving recesses 120 are opposite and can respectively receive a connector 190. Of course, the two receiving recesses 120 of the adapter 100 can be designed to mate with two different types of connectors. The fiber connector 190 is always attached to one end of a fiber cable 194 and a light beam can propagate down the fiber cable 194 and emit from the ferrule 196 of the connector 190. Likewise, a light beam can be coupled into the fiber cable 194 from the end face of the ferrule 196.

When the adapter 100 is used to couple two connectors 190 together, the two connectors 190 are respectively inserted into the receiving recesses 120. The ferrules 196 of the connectors 190 thus slide into a hollow sleeve (not shown in the figure) and are brought into axial alignment and contact with each other. A light beam will be able to propagate from the fiber cable 194 of a connector 190 through the interface between the two ferrules 196 and then reach the fiber cable 194 of the other connector 190, and vice versa.

When one connector 190 is disconnected from the adapter 100, the light beam originally propagating from the connector 190 still kept in the adapter 100 to the presently disconnected connector 190 will now leave the ferrule 196 and emit from the receiving recess 120. If the emitted light beam is high power and not obstructed, a lasting exposure to such light beam is harmful to people, particularly to the eyes. Thus, to avoid exposing to the high-power light beam, it is common to use a cap 180 to block up the unused receiving recess 120. This can obstruct the light beam and also prevent the receiving recess 120 from dust. If a connector 190 would like to be mated with the adapter 100, the cap 180 is required to be removed. However, the cap 180 is apt to get lost and it is still possible to expose the eyes to the light beam during mating.

Referring to FIG. 2, a conventional fiber adapter 200 is generally the same as the adapter 100 but further includes a cover 250 pivotally connected to the housing 110. The cover 250 covers the receiving recess 120 in its closed position. A spring 260 can force the cover 250 to be pivoted to its closed position when the receiving recess 120 is not mated with a connector 190. Thus, the cover 250 is capable of obstructing the light beam emitted from the receiving recess 120 in its closed position. If a user would like to mate a connector 190 with the adapter 200, he is first required to lift the cover 250 from its closed position and then to insert the connector 190 into the receiving recess 120. Upon pulling out the connector 190, the cover 250 is pivoted to cover the receiving recess 120 through the spring 260. As a result, the user has no chance to expose to the high-power light beam. However, the construction of the adapter 200 is much more complex than that of the adapter 100.

Referring to FIG. 3, a conventional protection cap 300 for the fiber adapter 100 includes a hollow housing 310 with two opposing openings and a cover 350 pivotally connected to the housing 310. The cover 350 is pivoted to cover one of the two openings through a spring 360. The protection cap 300 can be put on the adapter 100 and cover the outer surfaces of the side walls 160 and the receiving recess 120 of the adapter 100. When a user would like to mate a connector 190 with the adapter 200, he is required to lift the cover 350 from its closed position and then to insert the connector 190 into the receiving recess 120. Likewise, upon pulling out the connector 190, the cover 350 is pivoted to cover the receiving recess 120 by the spring 360. As a result, the user has no chance to expose to the high-power light beam emitted from the receiving recess 120. However, the structure of the protection cap 300 is somewhat complex and therefore it is not inexpensive. The introduction of the protection cap 300 to obstruct the light beam will cost much.

Accordingly, there exists a need to provide a solution to solve the aforesaid problems.

SUMMARY OF THE INVENTION

The present disclosure provides an optical fiber adapter with a shutter member that may obstruct the light beams emitted from the accommodation room thereby preventing the eyes from exposure to the light beams.

In one embodiment, the optical fiber adapter of the present disclosure includes a main body, an elastic shutter member and a pair of inner housings. The main body has an axial accommodation room defined by a first wall, a second wall, a third wall and a fourth wall, wherein the first wall faces the third wall and connects with the second and fourth walls. The accommodation room has a first opening opposite to a second opening in an axial direction. A protrusion is formed on the third wall. The shutter member includes a fixed portion, a shutter plate, a connecting portion, an extending portion and a bent portion. The fixed portion is positioned in the accommodation room and on the third wall. The connecting portion connects the fixed portion with the shutter plate. The shutter plate extends from the connecting portion and is positioned within the accommodation room. The extending portion extends from the fixed portion and the bent portion connects with the extending portion. The bent portion is attached to the protrusion on the third wall. The inner housings are positioned within the accommodation room. Each of the inner housings includes a hollow cylinder extending from a front surface of a flange, wherein the flanges of the inner housings are attached to each other and one of the flanges is positioned above the bent portion of the shutter member.

The present disclosure further provides a method of assembling the above optical fiber adapter.

The foregoing, as well as additional objects, features and advantages of the disclosure will be more readily apparent from the following detailed description, which proceeds with reference to the accompanying drawings.

DETAILED DESCRIPTION OF THE PREFERRED EMBODIMENT

Figure 1:
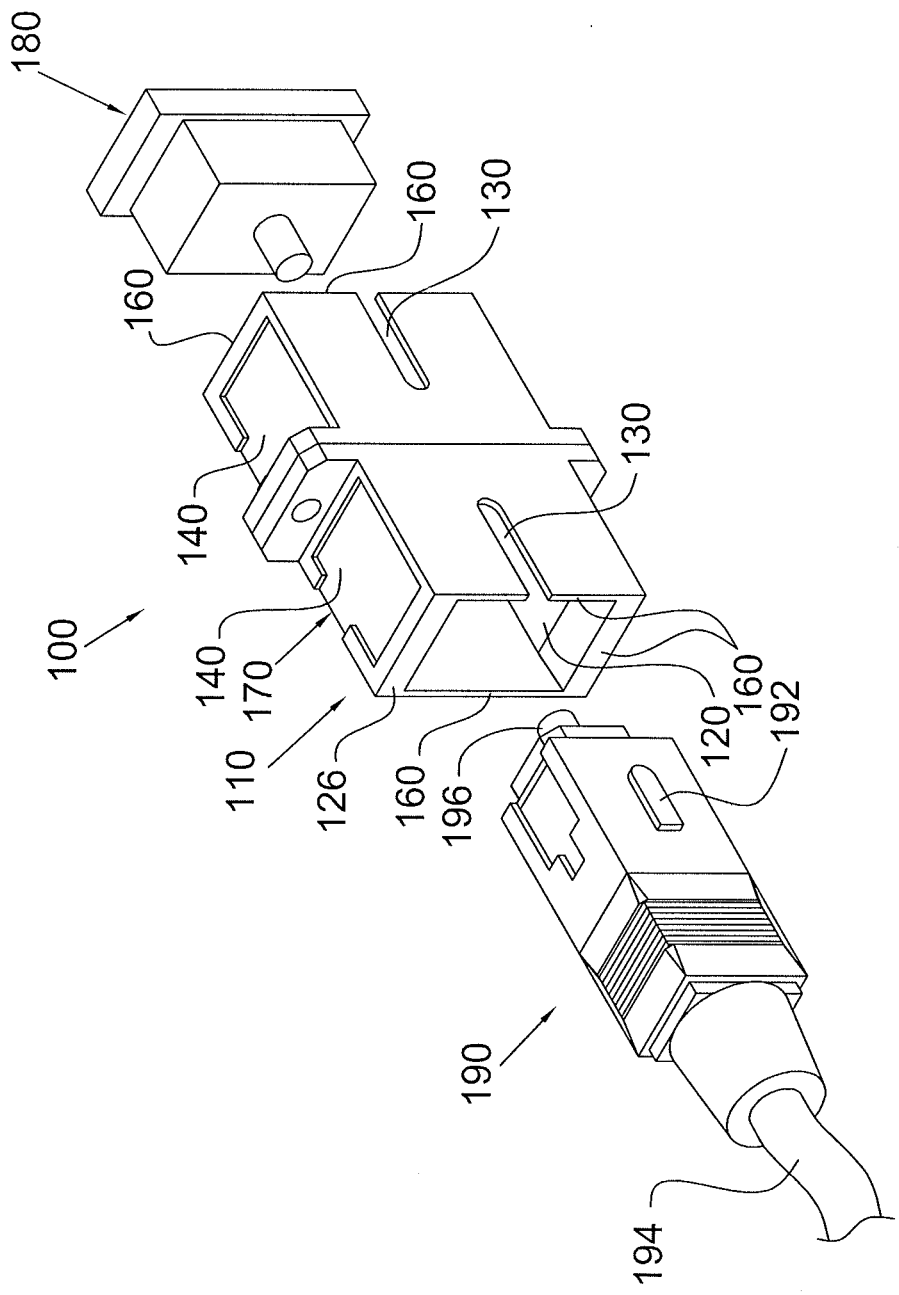
FIG. 1 is an elevated perspective view illustrating a conventional optical fiber adapter and a conventional optical fiber connector.
Figure 2:
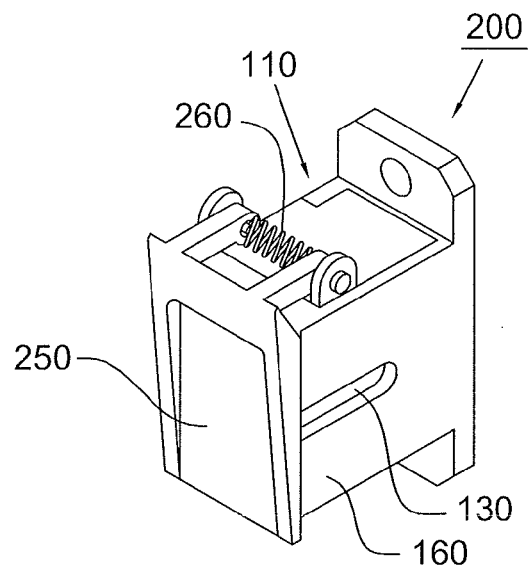
FIG. 2 is an elevated perspective view of a conventional optical fiber adapter with a cover for obstructing the light beams emitted from the receiving recess.
Figure 3:
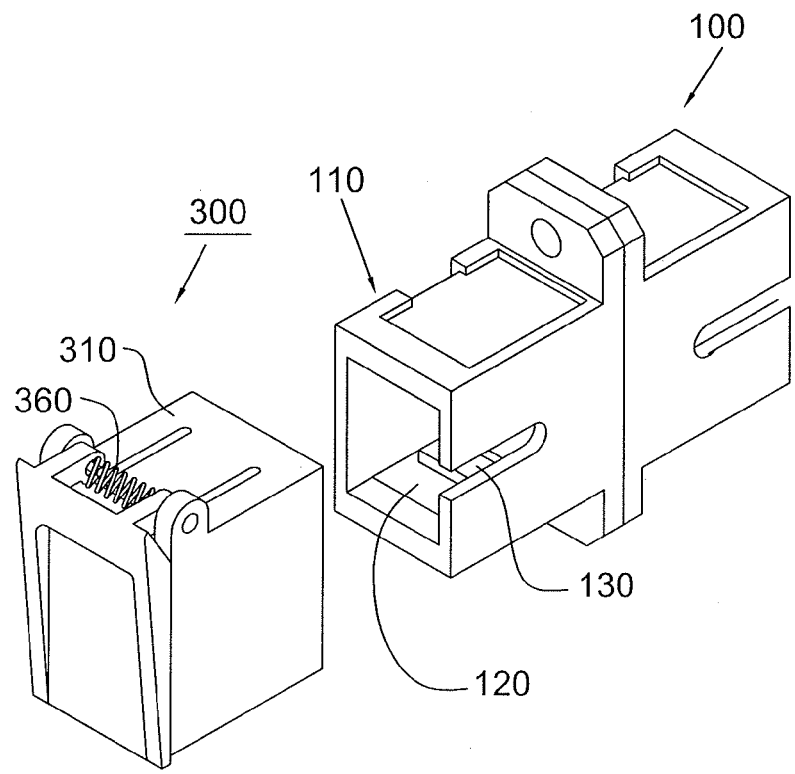
FIG. 3 is an elevated perspective view of a conventional protection cap for an optical fiber adapter.
Figure 4:
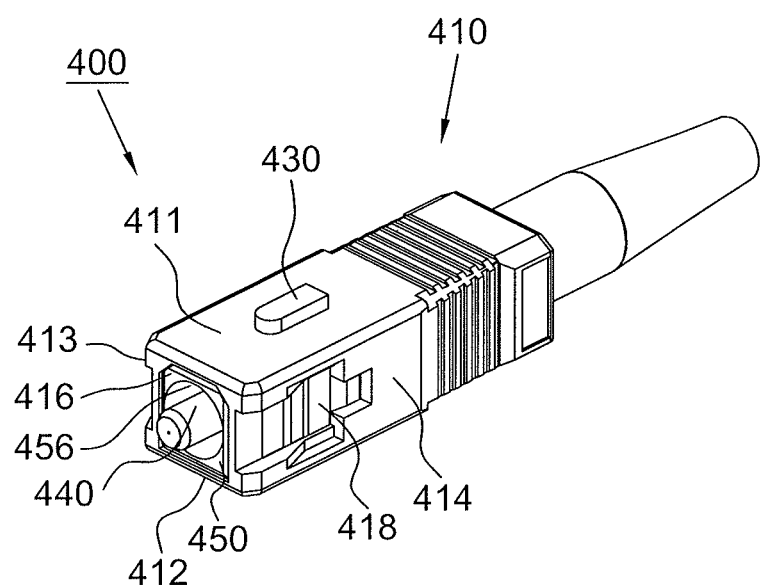
FIG. 4 is an elevated perspective view illustrating a conventional SC type optical fiber connector.

Referring to FIG. 4, a conventional SC type optical fiber connector 400 has a generally rectangular shape with a square cross section. The connector 400 includes a rectangular hollow outer housing 410 comprised of a top side-wall 411, a bottom side-wall 412, a right side-wall 413 and a left side-wall 414, wherein the right side-wall 413 is opposite to the left side-wall 414 and connects with the bottom side-wall 412 and the top side-wall 411. A protrusion 430 is formed on the top side-wall 411 and a through opening 418 is formed on each of the left and right side-walls 414, 413. A hollow inner housing 450 is placed within the outer housing 410 that may move back and forth through a rectangular opening 416 on the front end of the outer housing 410. In addition, a ferrule 440 is placed in the inner housing 450 and protrudes from a circular opening 456 on the front end of the inner housing 450 and from the opening 416 on the outer housing 410. A spring is located inside the inner housing 450 to allow the ferrule 440 to move back and forth through the openings 416, 456 (not shown in the figure).

Referring to FIGS. 5a to 5g, the optical fiber adapter according to the present disclosure includes a unitary molded plastic main body 510. The main body 510 is substantially rectangular and has an accommodation room 515 defined by a top side-wall 511, a bottom side-wall 512, a right side-wall 513 and a left side-wall 514, wherein the top side-wall 511 faces the bottom side-wall 512 and connects with the right side-wall 513 and left side-wall 514. The accommodation room 515 has opposing first opening 517 and second opening 518 in an axial direction through which an optical fiber connector, for example, the optical fiber connector of FIG. 4, may be inserted into the accommodation room 515. At least one elastic supporting plate 528, for example, two elastic supporting plates 528 are positioned over the bottom side-wall 512 for a predetermined distance. Specifically, the supporting plates 528 are located away from the bottom side-wall 512 and therefore a clear gap is formed between the supporting plates 528 and the bottom side-wall 512. A stop block 522 is formed on each of the supporting plates 528. At least one elastic supporting plate 527, for example, two elastic supporting plates 527 are positioned over the top side-wall 511 for a predetermined distance. Specifically, the supporting plates 527 are located away from the top side-wall 511 and therefore a clear gap is formed between the supporting plates 527 and the top side-wall 511. A stop block 521 is formed on each of the supporting plates 527. At least one stop block 523 is formed on the right side-wall 513 and at least one stop block 524 is formed on the left side-wall 514. Each of the stop blocks 521, 522, 523, 524 has a narrow top surface, a wide bottom surface, an inclined side surface 529 facing the first opening 517 of the accommodation room 515 and a vertical side surface facing the second opening 518 of the accommodation room 515. Two stop blocks 533 are further formed on the right side-wall 513, wherein one stop block 533 is positioned near the top side-wall 511 and the other stop block 533 is positioned near the bottom side-wall 512. Two stop blocks 534 are further formed on the left side-wall 514, wherein one stop block 534 is positioned near the top side-wall 511 and the other stop block 534 is positioned near the bottom side-wall 512.

Figure 5A:
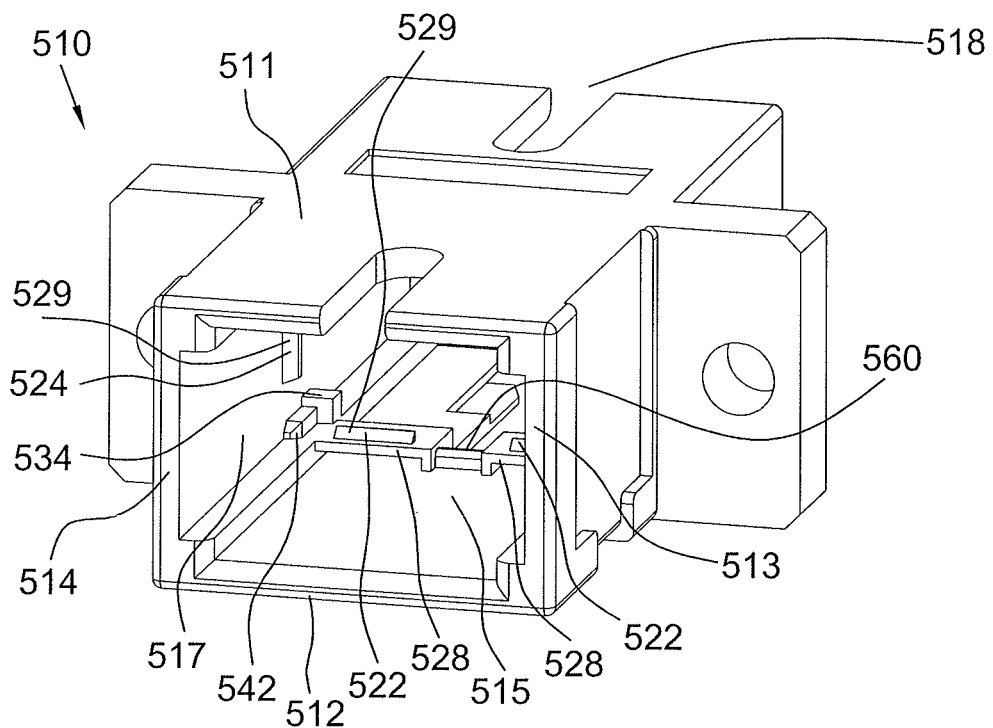
FIGS. 5a to 5e are different perspective views of the main body of the optical fiber adapter of the present disclosure.
Figure 5B:
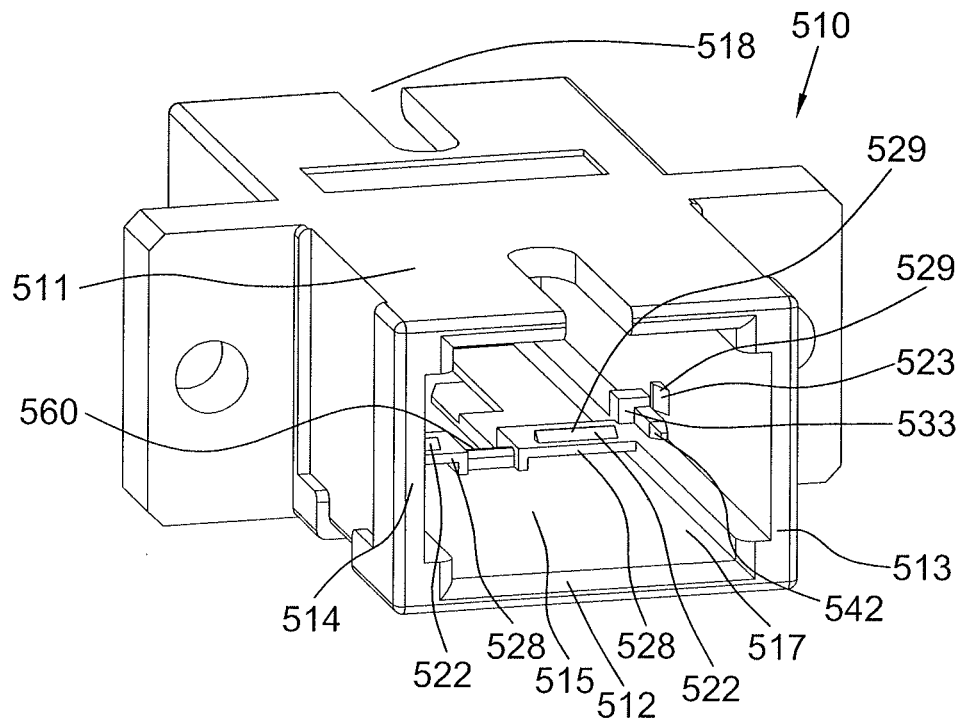
Figure 5C:
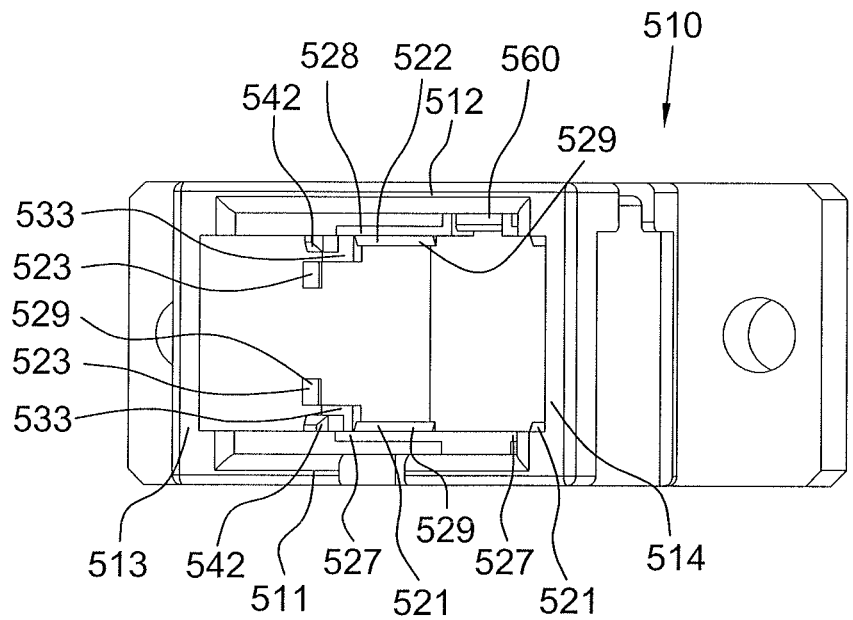
Figure 5D:
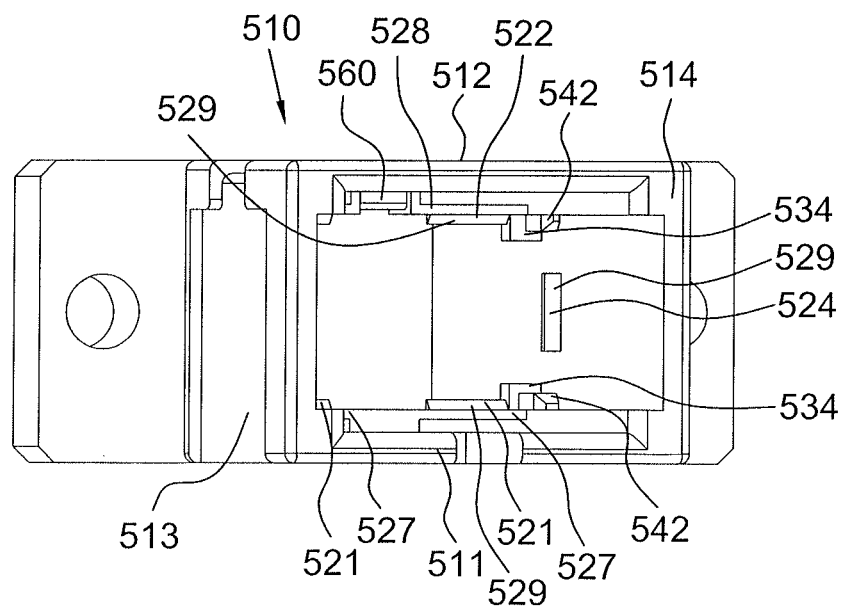
Figure 5E:
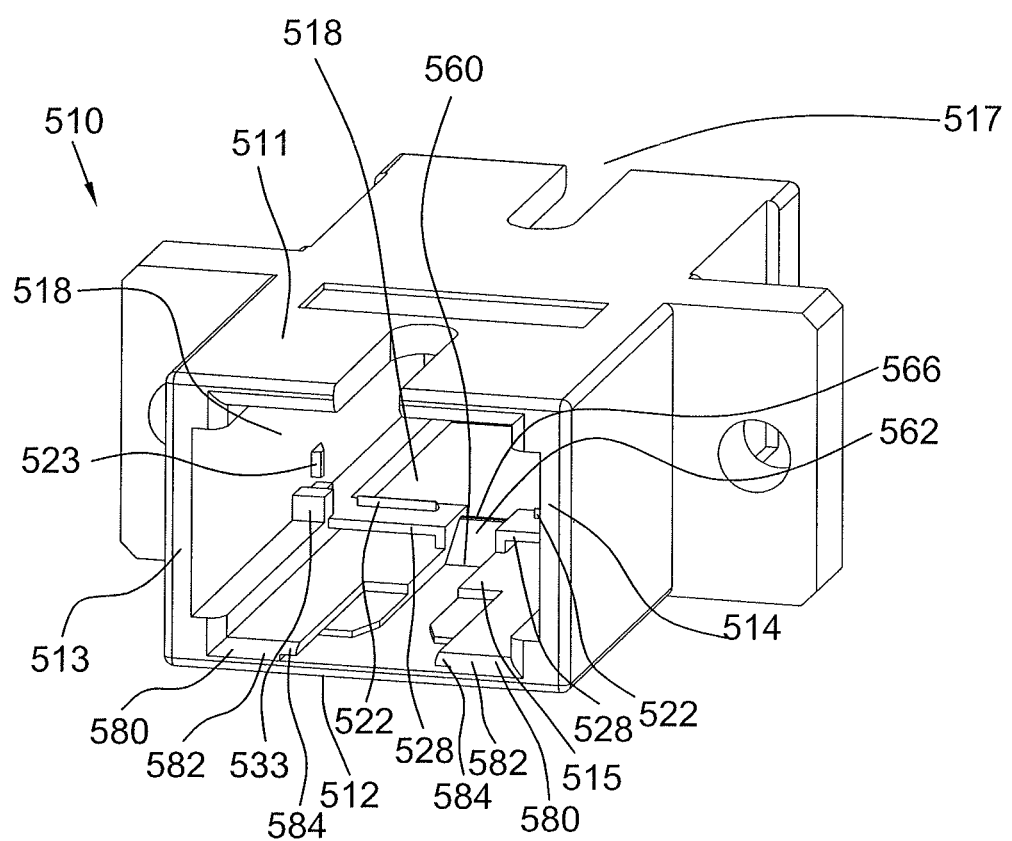
Figure 5F:
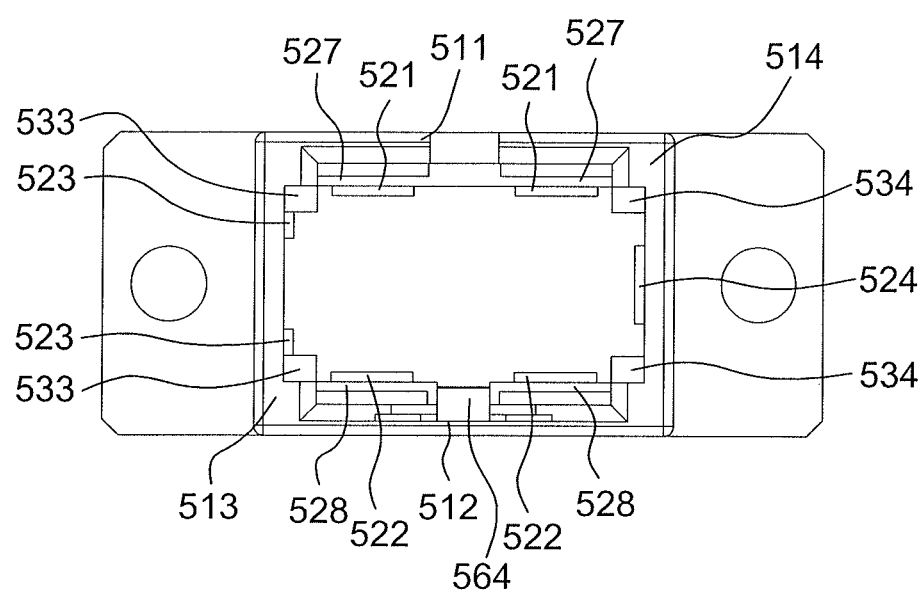
FIG. 5f is a rear view of the main body of the optical fiber adapter of the present disclosure.
Figure 5G:
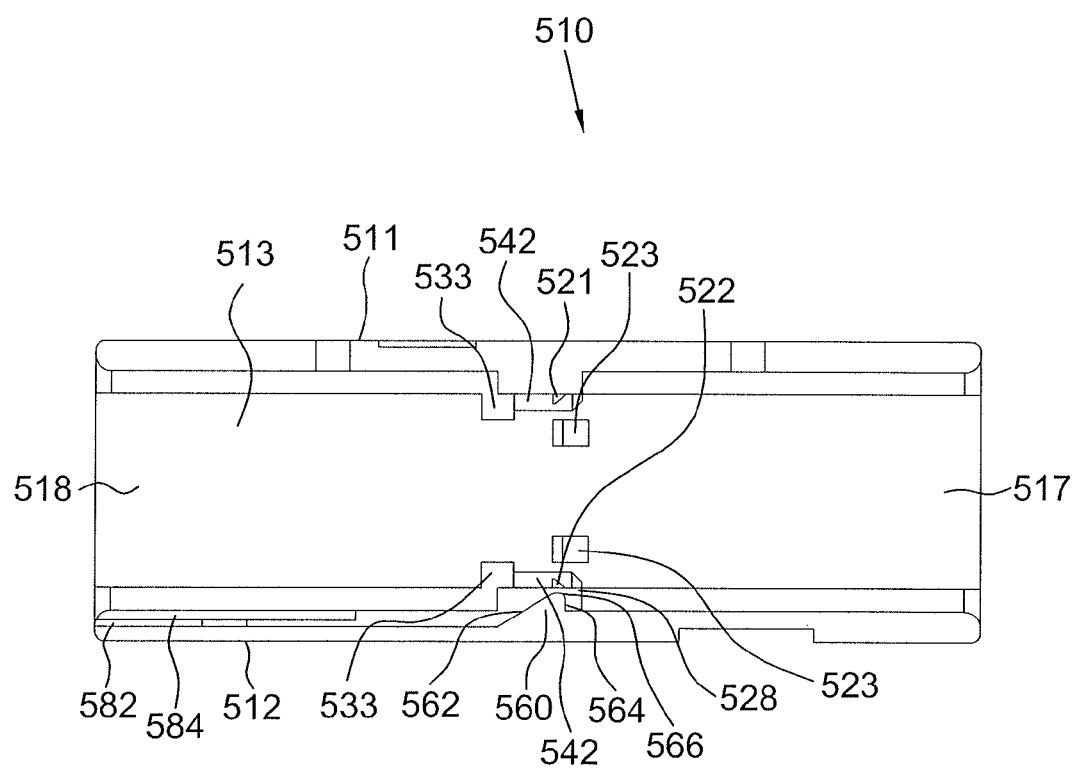
FIG. 5g is a cross-sectional view of the main body of the optical fiber adapter of the present disclosure.

In addition, referring to FIGS. 5e and 5g, a pair of protrusions 580 substantially has an inverted L shape and is formed within the accommodation room 515 and on the bottom side-wall 512. Each of the protrusions 580 includes a vertical portion 582 extending from the bottom side-wall 512, and a horizontal portion 584 extending horizontally from the top of the vertical portion 582. Therefore, a clear gap is formed between the horizontal portion 584 and the bottom side-wall 512. Furthermore, a protrusion 560 is formed on the bottom side-wall 512 and between the two supporting plates 528. The protrusion 560 has a top surface 566, an inclined side surface 562 facing the second opening 518 of the accommodation room 515, and a vertical side surface 564 facing the first opening 517 of the accommodation room 515.

Figure 6A:
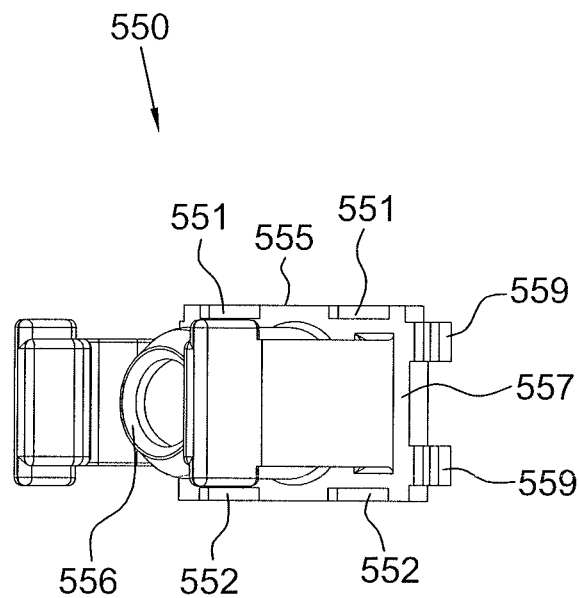
FIG. 6a is a perspective view of the inner housing of the optical fiber adapter of the present disclosure.
Figure 6B:
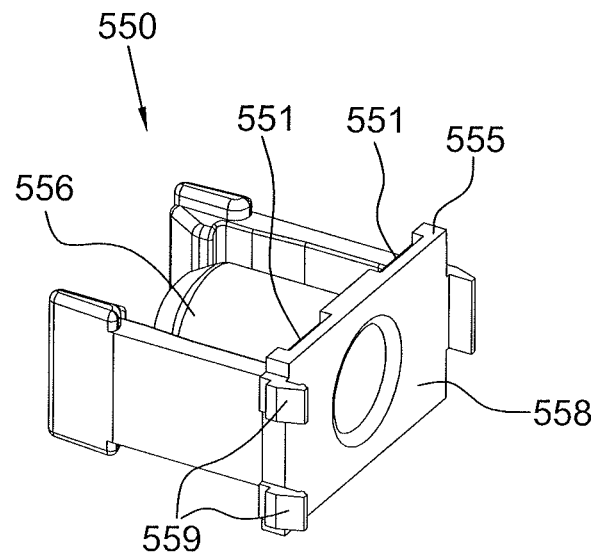
FIG. 6b is another perspective view of the inner housing of the optical fiber adapter of the present disclosure.

Referring to FIGS. 6a and 6b, the optical fiber adapter of the present disclosure includes a pair of inner housings 550. The two inner housings 550 are identical to each other in structure and are placed within the accommodation room 515. Each of the inner housings 550 is provided with a pair of hooks extending from a front surface 557 of a generally rectangular flange 555. The flange 555 includes a hollow cylinder 556 located between the two hooks. In addition, two indentations 551 and two indentations 552 are formed at two opposing edges of the front surface 557 of the flange 555, respectively, which are configured to receive the stop blocks 521 and 522, respectively. A plurality of hooks 559 extends from an edge of a back surface 558 of the flange 555.

Figure 7:
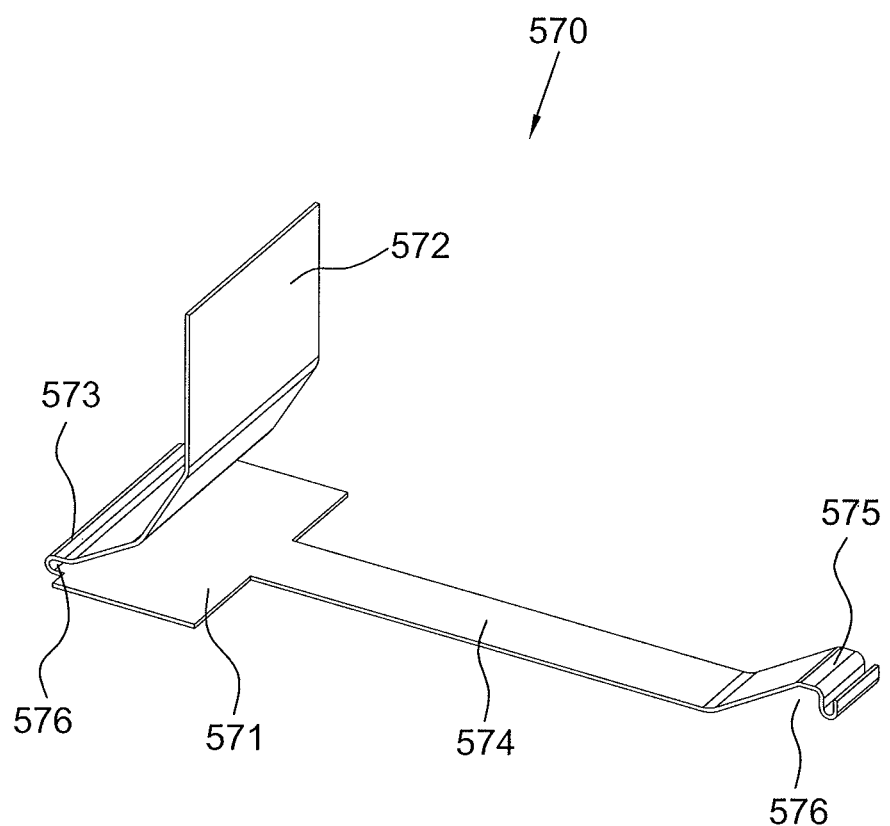
FIG. 7 is an elevated perspective view of the shutter member of the optical fiber adapter of the present disclosure.
Figure 8:
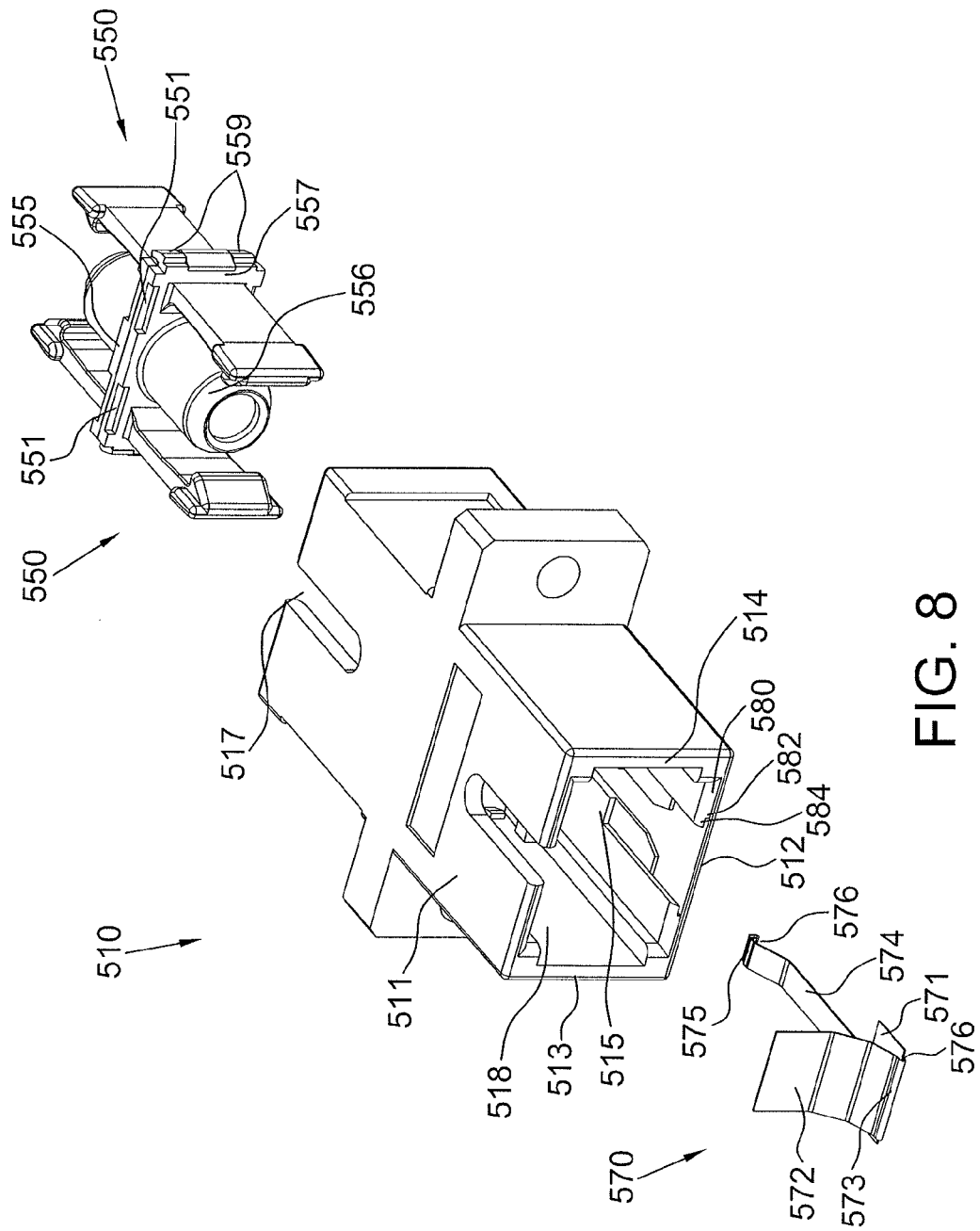
FIG. 8 illustrates the shutter member, combined inner housings, and main body according to the present disclosure.
Figure 9:
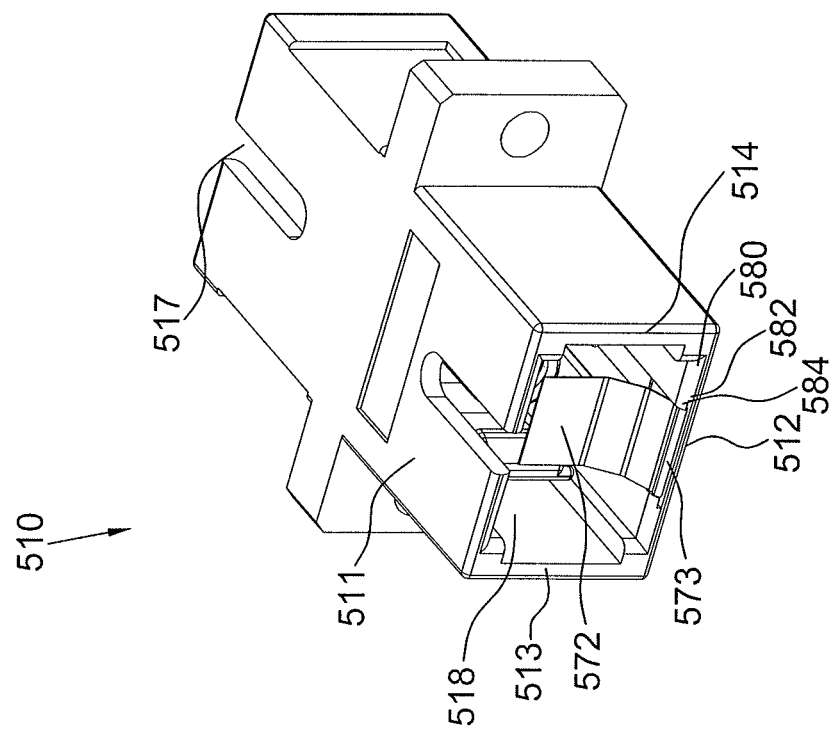
FIG. 9 is an elevated perspective view of the optical fiber adapter of the present disclosure.
Figure 10A:
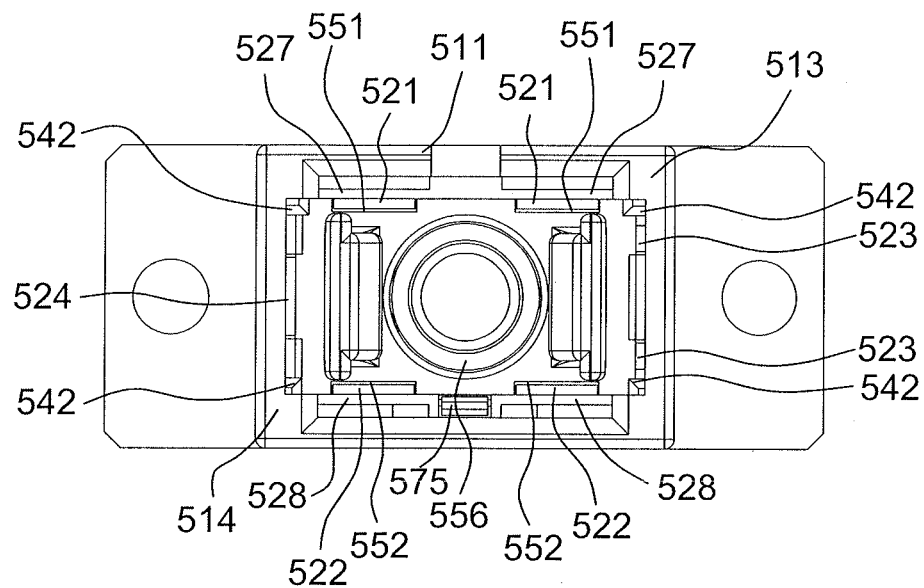
FIG. 10a is a front view of the optical fiber adapter of the present disclosure.
Figure 10B:
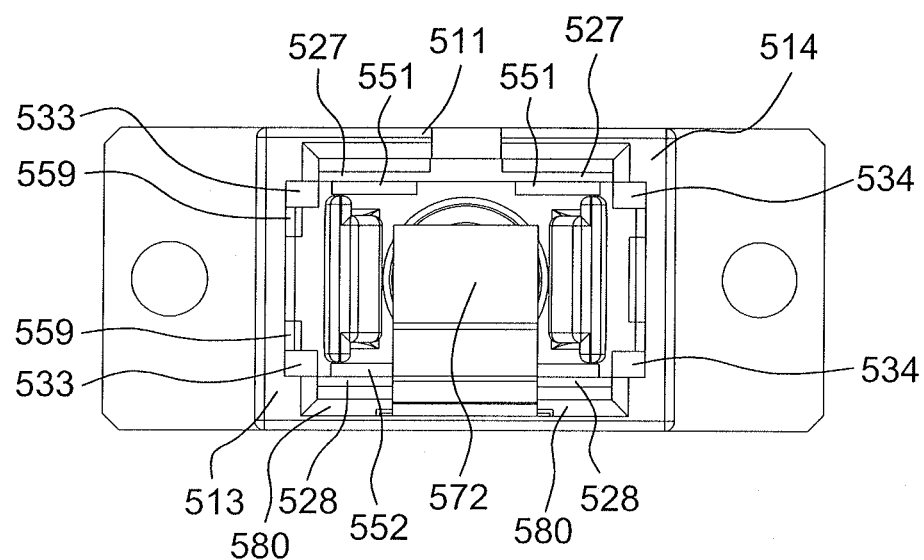
FIG. 10b is a rear view of the optical fiber adapter of the present disclosure.
Figure 11A:
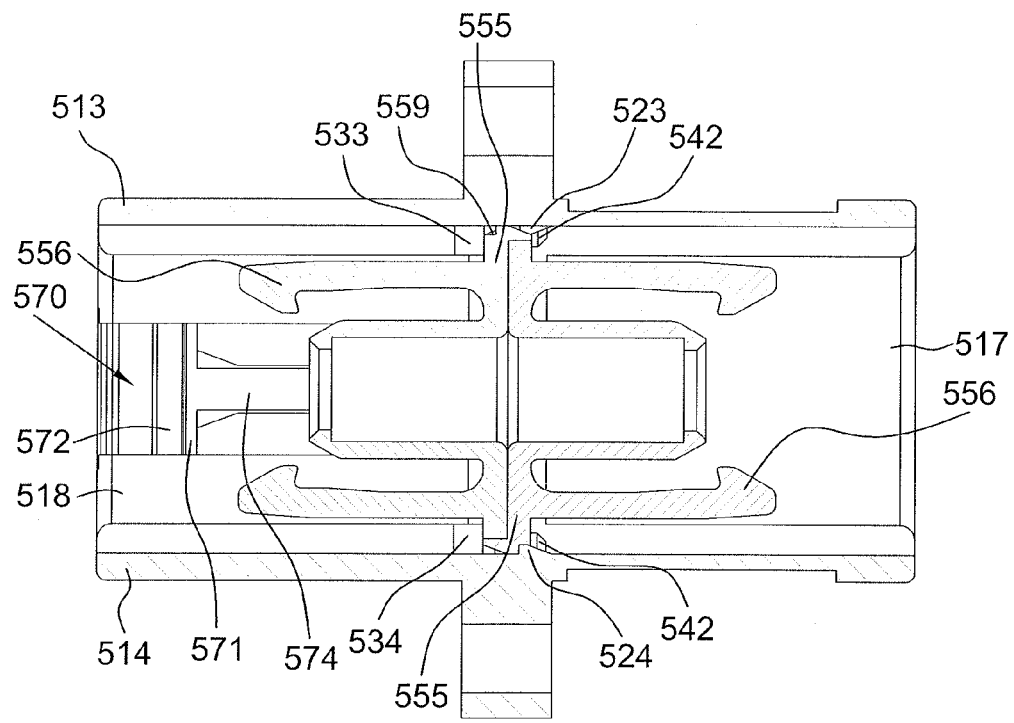
FIG. 11a is a cross-sectional view of the optical fiber adapter of the present disclosure.
Figure 11B:
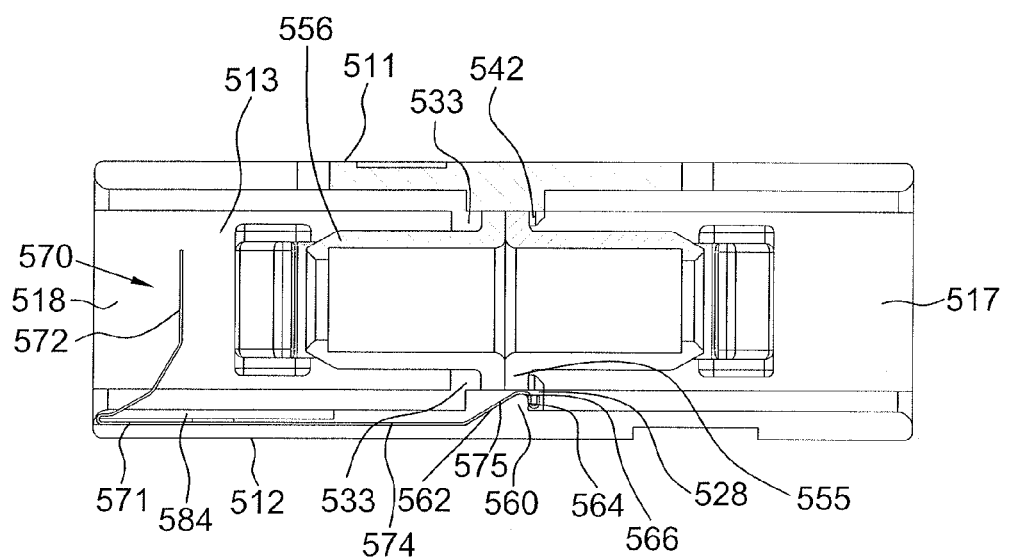
FIG. 11b is another cross-sectional view of the optical fiber adapter of the present disclosure.

Referring to FIG. 7, the optical fiber adapter according to the present disclosure further includes an elastic shutter member 570 that is integrally formed with metal. The shutter member 570 includes a shutter plate 572, a fixing portion 571, and a connecting portion 573 connecting the fixing portion 571 with the shutter plate 572. The connecting portion 573 is generally C-shaped. That is, the connecting portion 573 is curved and has a notch 576. The shutter plate 572 may contain a single plate or double plates. The shutter plate 572 may move with respect to the fixing portion 571 and the angle between the above elements is smaller than 90 degrees. The shutter plate 572 is moved close to the fixing portion 571 with a push force and quickly springs up to an original position when the push vanishes. In addition, an extending portion 574 extends from the fixed portion 571 and a bent portion 575 is formed at a rear end of the extending portion 574. The bent portion 575 has a downward concave 576.

Referring to FIG. 7, when desiring to assemble the optical fiber adapter of the present disclosure, the shutter member 570 is first pushed into the accommodation room 515 of the main body 510 through the second opening 518 in such a manner that each of two opposing sides of the fixing portion 571 is positioned between the horizontal portion 584 of one of the protrusions 580 and the bottom side-wall 512. The bent portion 575 is attached to the inclined side surface 562, vertical side surface 564, and top surface 566 of the protrusion 560. Afterward, the two inner housings 550 are combined together by attaching the back surface 558 of the flanges 555 to each other. The hooks 559 formed on one the flange 555 hook on to an edge of the other flange 555. Subsequently, the combined inner housings 550 are inserted into the accommodation room 515 through the first opening 517 thereof. When the inner housings 550 continue to be pushed into the accommodation room 515, the front surface 557 of the heading flange 555 will first meet the stop blocks 521, 522, 523, 524 and the flanges 555 then slide upward on the inclined side surfaces 529 of the stop blocks 521, 522, 523, 524.

Referring to FIGS. 10a, 10b, 11a and 11b, after the flanges 555 pass the stop blocks 521, 522, 523, 524, the stop blocks 533, 534 will then stop the flanges 555 from moving ahead and the stop blocks 521, 522 are received in the indentations 551, 552 of the tail flange 555. If a pull force is exerted on the inner housings 550, the tail flange 555 will meet the vertical side surfaces of the stop blocks 521, 522, 523, 524 thereby prevent the inner housings 550 from being pulled out of the accommodation room 515 through the first opening 517. Therefore, when the inner housings 550 are located in position in the accommodation room 515, the edges of the two flanges 555 will be positioned between the stop blocks 521, 522, 523, 524 and the stop blocks 533, 534. By this arrangement, the movement of the flanges 555 within the accommodation room 515 in the axial direction will be restricted. In addition, when the inner housings 550 are located in position in the accommodation room 515, the protrusion 560 on the bottom side-wall 512 will be positioned under the flanges 555. Therefore, the bent portion 575 attached to the protrusion 560 will also be positioned under the flanges 555.

According to the optical fiber adapter of the present disclosure, since the stop blocks 521, 522 are positioned on the elastic supporting plates 527, 528, respectively, the stop blocks 521, 522 will be pushed down when the flanges 555 of the inner housings 550 slide on the inclined side surfaces 529 of the stop blocks 521, 522. Therefore, this arrangement may help the flanges 555 pass the stop blocks 521, 522. Referring to FIGS. 5a to 5d again, a plurality of guiding blocks 542 is formed on the left and right side-walls 514, 513. The guiding blocks 542 are of tapering shape and may restrict the traverse movement of the flanges 555 of the inner housings 550 in the accommodation room 515 when the inner housings 550 are inserted into the accommodation room 515 in the axial direction.

According to the optical fiber adapter of the present disclosure, since the bent portion 575 of the shutter member 570 is attached to the protrusion 560 and is positioned under the flanges 555 of the inner housings 550, the bent portion 575 will meet and be stopped by the flanges 555 when a pull force is exerted on the shutter member 570. As a result, the bent portion 575 prevents the shutter member 570 from being pulled out of the main body 510.

According to the optical fiber adapter of the present disclosure, the shutter plate 572 will be located in front of the opening of the hollow cylinder 556 when the shutter member 570 is positioned in place. This way the light beams emitted from the cylinder 556 may be obstructed thereby preventing a user's eyes from exposure to the harmful light beams.

Figure 12:
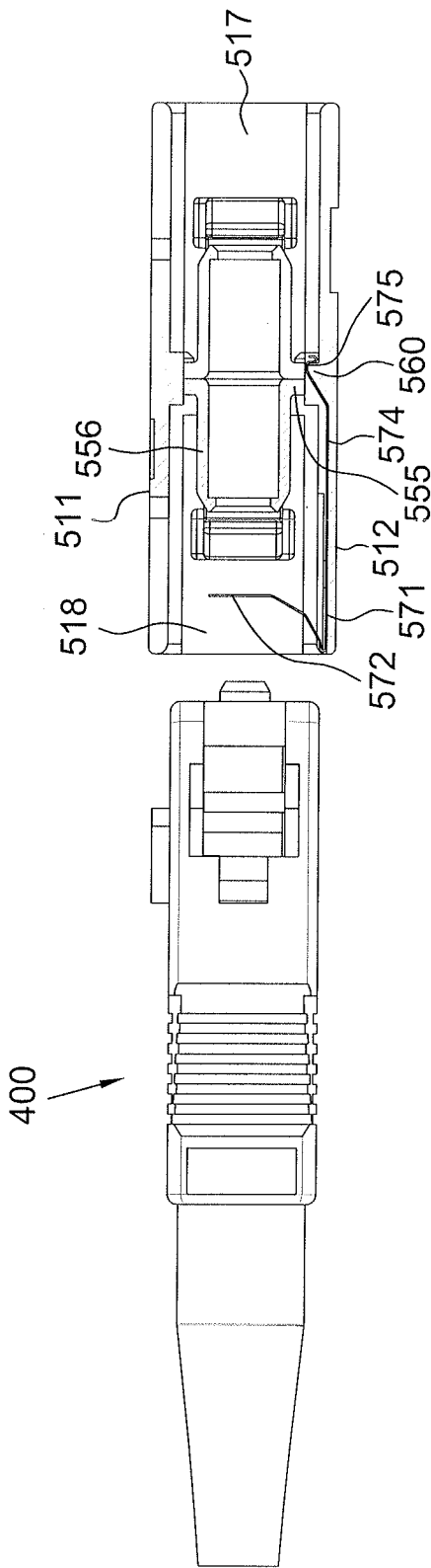
FIGS. 12 and 13 illustrate how to mate an optical fiber connector with the optical fiber adapter of the present disclosure.
Figure 13:
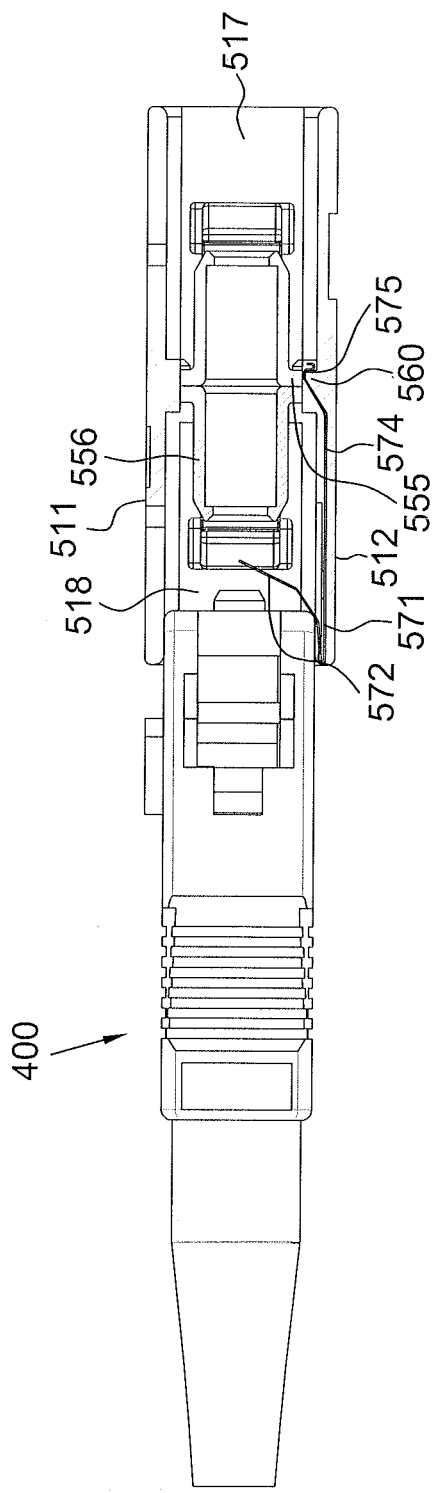

Referring to FIGS. 12 and 13, according to the optical fiber adapter of the present disclosure, there is no need to detach the shutter member 570 from the main body 510 prior to inserting the optical fiber connector 400 into the accommodation room 515 of the main body 510. When the connector 400 is inserted into the main body 510, it will push down the elastic shutter plate 572 to the gap between the connector 400 and the bottom side-wall 512 of the main body 510. Upon pulling out the connector 400, the elastic shutter plate 572 will quickly spring up to an original position to obstruct the light beams emitted from the cylinder 556 as a result of elasticity. As a result, the occurrence of exposure to the harmful light beams may be avoided. Furthermore, when the connector 400 is inserted into the main body 510 to cause the elastic shutter plate 572 to be pushed down, the root of the shutter plate 572 and therefore the sides of the fixing portion 571 will be levered up slightly. To solve this problem, the sides of the fixing portion 571 are positioned under the horizontal portions 584 of the protrusions 580. This may prevent the fixing portion 571 from being pulled upward from the bottom side-wall 512.

Although the present disclose has been explained in detailed with SC type optical fiber adapter, it will be appreciated that the optical fiber adapter of the present disclosure may include other types of adapters. For example, the optical fiber adapter of the present disclosure may be the LC type optical fiber adapter.

Although the preferred embodiments of the disclosure have been disclosed for illustrative purposes, those skilled in the art will appreciate that various modifications, additions and substitutions are possible, without departing from the scope and spirit of the disclosure as disclosed in the accompanying claims.

What is claimed is:

1. An optical fiber adapter, comprising:
   a main body having an accommodation room defined by a first wall, a second wall, a third wall and a fourth wall, the first wall facing the third wall and connecting with the second and fourth walls, wherein the accommodation room has opposing first and second openings in an axial direction, a protrusion is formed on the third wall;

an elastic shutter member comprising:
  a fixing portion positioned within the accommodation room and on the third wall;
  a shutter plate;
  a connecting portion connecting the fixing portion with the shutter plate; and
  an extending portion extending from the fixed portion; and
  a bent portion connecting with the extending portion, the bent portion being attached to the protrusion on the third wall,
  wherein the shutter plate extends from the connecting portion and into the accommodation room; and
a pair of inner housings positioned within the accommodation room, each of the inner housings comprising:
  a flange having opposing front and back surfaces; and
  a hollow cylinder extending from the front surface of the flange,
  wherein the flanges of the two inner housings are attached to each other, and one of the flanges is positioned above the bent portion of the elastic shutter member.

2. The optical fiber adapter as claimed in claim 1, further comprising:
  a first stop block positioned on the first wall;
  a second stop block positioned within the accommodation room;
  a third stop block positioned on the third wall; and
  a fourth stop block positioned within the accommodation room;
  wherein the flanges of the two inner housings are positioned between the first and second stop blocks, and between the third and fourth stop blocks, and wherein the first, second, third and fourth stop blocks are positioned to restrict a movement of the flanges in the axial direction,
  wherein the first opening is configured for an optical fiber connector and the two inner housings to insert into the accommodation room.

3. The optical fiber adapter as claimed in claim 2, further comprising an elastic supporting plate to carry the first stop block.

4. The optical fiber adapter as claimed in claim 3, wherein the elastic supporting plate is located away from the first wall.

5. The optical fiber adapter as claimed in claim 2, further comprising an elastic supporting plate to carry the third stop block.

6. The optical fiber adapter as claimed in claim 5, wherein the elastic supporting plate is located away from the third wall.

7. The optical fiber adapter as claimed in claim 2, wherein each of the first and third stop blocks has an inclined side surface facing the first opening of the accommodation room.

8. The optical fiber adapter as claimed in claim 7, further comprising:
  a fifth stop block positioned on the second wall; and
  a sixth stop block positioned on the fourth wall,
  wherein each of the fifth and sixth stop blocks has an inclined side surface facing the first opening of the accommodation room.

9. The optical fiber adapter as claimed in claim 7, further comprising:
  a first guiding block and a second guiding block positioned on the second and fourth walls, respectively.

10. The optical fiber adapter as claimed in claim 7, wherein each of the inner housings has a hook extending from the flange to hook on to the flange of the other inner housing.

11. The optical fiber adapter as claimed in claim 2, wherein the second and fourth stop blocks are positioned on the second and fourth walls, respectively.

12. The optical fiber adapter as claimed in claim 2, wherein a plurality of indentations is formed on the front surface of one of the flanges to receive the first and third stop blocks, respectively.

13. The optical fiber adapter as claimed in claim 1, wherein the main body is integrally formed.

* * * * *